Patented Aug. 22, 1944

2,356,582

UNITED STATES PATENT OFFICE 2,356,582

STIMULANTS SUITABLE FOR COMBATING SYMPTOMS OF FATIGUE AND PROCESS FOR THEIR PRODUCTION

Felix Haffner, Tubingen, and Fritz Sommer, Berlin-Charlottenburg, Germany; vested in the Alien Property Custodian No Drawing. Application February 11, 1939, Serial No. 255,882

3 Claims. (Cl. 260—570.8)

This invention relates to new stimulants suitable for combating symptoms of fatigue. The new stimulants contain as active principle aliphatic hydrocarbons having at least 4 carbon atoms and substituted at two adjoining non-terminal carbon atoms by one phenyl group and one amino or alkyl amino group or the salts of such substituted hydrocarbons.

The stimulants according to this invention thus belong, by their chemical constitution, to the group of aliphatic amines substituted by an aromatic radical. Numerous physiologically active substances occurring in nature belong to this large group of compounds. Among the earliest investigated were the physioligical effects of compounds of the adrenaline type. These compounds are characterized by their capacity for peripheral stimulation of the sympathetic system.

Whilst in adrenaline the phenyl radical contains two adjacent hydroxyl groups, ephedrine possesses an unsubstituted phenyl radical. The stimulants provided according to the present invention also possess an unsubstituted phenyl radical. Ephedrine differs from adrenaline in that it exhibits stronger central effects which are manifested in an activation of respiration and increase of blood pressure. Ephedrine is an amino-alcohol and thus, like adrenaline, contains a hydroxyl group in the aliphatic sidechain. More recently, the physiological effects of an aliphatic amine substituted by a phenyl radical and free from hydroxyl groups, namely 1-phenyl-2-aminopropane, have been exhaustively investigated. 1 phenyl-2-aminopropane is distinguished from ephedrine by its still more prominently exhibited central effects; this is especially manifested in the influence of 1-phenyl-2-aminopropane on the psychical functions. For this reason 1-phenyl-2-aminopropane is suitable for combating fatigue conditions, for the relief of depressions and for combating conditions of intoxication.

The stimulants according to the invention, which contain as active principle aliphatic hydrocarbons having 4 carbon atoms and substituted at two adjoining non-terminal carbon atoms by one phenyl and one amino or alkyl amino group, are similar in action but preferable in several respects to 1-phenyl-2-aminopropane. The alkyl groups at the nitrogen atom may be methyl, ethyl, and propyl radicals. One as well as both the hydrogen atoms can be substituted by the abovementioned alkyl groups.

Of special importance among the new stimulants are those which contain 2-phenyl-3-aminobutane as active principle. 2-phenyl-3-methylaminobutane also has proved very effective.

In comparison with 1-phenyl-2-aminopropane, 2-phenyl-3-aminobutane is distinguished by its very much milder action. Whilst the quantities required to produce the first observable effects are about equally large for the two compounds, and amount in experiments on animals to about 0.01 mg. per gram weight of the animal, the toxic dose with the previously known 1-phenyl-2-aminopropane is about ten times the amount of the minimum dose, whilst with 2-phenyl-3-aminobutane nothing less than twenty times the amount of the minimum dose has a toxic action. This increase of the quotient toxic dose: effective dose is a great advantage of the new stimulants. The action of the new stimulants which contain 2-phenyl-3-aminobutane takes place as rapidly as that of the previously known stimulants containing 1-phenyl-2-aminopropane. An especial advantage of the new stimulants containing 2-phenyl-3-aminobutane is however the fact that their action ceases more rapidly than that of stimulants which contain 1-phenyl-2-aminopropane. This more rapid cessation is of especial importance in relation to the fact that it is frequently necessary to combat symptoms of fatigue for a short time only, whereas after the expiration of the period during which wakefulness is desired a normal sleep is desired. The shorter period of action of the new stimulants containing 2-phenyl-3-aminobutane as active principle is not detrimental, inasmuch as when a longer period of wakefulness is desired this can at any time be attained by means of a renewed dose.

Owing to their milder action, as described, the new stimulants are principally of importance for combating symptoms of fatigue in normal persons. The practical importance of a stimulant suitable for combating symptoms of fatigue in normal persons is very great. For example, numerous motor accidents when driving at night are due to the driver falling asleep. This danger can effectively be combated by means of the new stimulants. The new stimulants are further of value to persons who suffer from great tiredness at certain times of the day. Such conditions of lassitude are frequently combined with coincident psychical depressions. The new stimulants prove advantageous in all these cases. Since for the most part it will be a matter of a frequently recurring use of the stimulants, it is a great advantage that they show no undesirable secondary affects. For example, the stimulants containing 2-phenyl-3-aminobutane or 2-phenyl-3-methylaminobutane as active principle do not even produce the unpleasant feeling of dryness in the mouth which frequently arises as a consequence of the action of 1-phenyl-2-aminopropane. Further, no habituation to the new stimulants is developed, so that continually increasing doses are not rendered necessary; in addition, no craving for the new stimulants is to be observed.

Another field of application for the new stimulants is the combating of symptoms such as appear after the use of narcotics and hypnotics, for example the combating of the effects of alcoholic intoxication and of the symptoms of poisoning after excessive doses of barbituric acid derivatives. Owing to the milder action of stimulants containing 2-phenyl-3-aminobutane as active principle, larger doses are required in these cases than would be with stimulants containing 1-phenyl-2-aminopropane as active principle. Owing to the smaller toxicity of 2-phenyl-3-aminobutane, this fact is however of no importance and the new stimulants are as suitable for these purposes as are the stimulants containing 1-phenyl-2-aminopropane as active principle.

As has already been described, the stimulants according to the invention which are of the greatest importance are those containing 2-phenyl-3-aminobutane or 2-phenyl-3-methylaminobutane as active principle. It is an especial advantage of the stimulants containing 2-phenyl-3-aminobutane, again in comparison with 1-phenyl-2-aminopropane, that their action with regard to the combating of symptoms of fatigue in normal persons is not weaker but only milder, i. e., of shorter duration and not accompanied by secondary effects.

The new stimulants may of course be used in combination with other medicines. They may, for example, be used instead of caffeine in mixtures containing a stimulant such as caffeine. The combined use with other stimulants, such as stimulants of the uric acid series, e. g., caffeine, is however also envisaged, whereby superadditional effects are sometimes to be observed. Finally, advantageous results also result from the combination of the new stimulants with ephedrine.

The new stimulants, whose active principle is an aliphatic hydrocarbon having 4 carbon atoms and substituted at two adjoining nonterminal carbon atoms by one phenyl group and one amino or an alkylated amino group, may contain the given compounds either as such or in the form of their salts. The salts of all acids which do not for their part bring about undesirable physiological effects may be used. As inorganic acids there may be mentioned, for example, hydrochloric acid, sulfuric acid, phosphoric acid; as organic acids, acetic acid, lactic acid, tartaric acid may be named.

The most varied methods of application of the new stimulants may be employed. A very prompt action is produced on oral application of the new stimulants. For oral application, the salts of the new compounds will mainly be used. These salts may be manufactured into tablets, dragees or similar products. Since doses of 5 to 10 mg. are mostly concerned, the tablets are very small. Owing to their good solubility, an extensive resorption of the stimulants takes place in the oral cavity promptly. An especially rapid action is thereby produced. Since the salts of the new stimulants have a good solubility in water, the preparation of aqueous solutions which may be applied in drop form also is to be considered. The sulfuric acid salt of 2-phenyl-3-aminobutane is soluble up to 14% in water, so that relatively concentrated solutions may be prepared, whereas the limit of solubility of 1-phenyl-2-aminopropane sulfate is about 7%.

For percutaneous application of the new stimulants, solutions in salves, suppositories or other oily or fatty solvents are of especial importance. For the preparation of these solutions in oily or fatty solvents, either the bases themselves or suitable salts such as, for example, the oleic acid or fatty acid salts of the given compounds may be used. Finally the inhalation of the new stimulants may also be considered, whereby preparations containing the free base may appropriately be employed, or aqueous solutions of the salts of the active compounds may be finely divided in a spraying apparatus and the air thus charged may be inhaled.

For purposes of injection, aqueous solutions of the salts of the new compounds are of primary importance. The same is true for cases where the new compounds are to be applied in the form of eye-drops.

The new compounds contain at least two centres of asymmetry, these being
(1) The carbon atom to which the phenyl group is attached, and
(2) The carbon atom to which the amino group is attached.

Owing to the non-equivalence of these two centres of asymmetry, the new compounds must exist in the form of two pairs of optical antipodes not agreeing in their physical properties and two racemates. These stereoisomers all display the described physiological effects, although perhaps in different degrees.

The preparation of the new stimulants may be carried out according to the usual organic chemical methods for the synthesis of amines. One mode of preparation consists in the conversion of the corresponding ketone into the oxime and the reduction of the oxime to the amino compound. As an example there may be given the reaction of 2-phenyl-3-butanone with hydroxylamine and the reduction of the oxime so obtained to 2-phenyl-3-aminobutane. The same amine is obtained if 2-phenyl-3-butanone is converted by means of hydrazine into the azine:

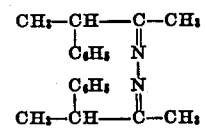

which by reduction and splitting of the N—N linkage likewise yields 2-phenyl-3-aminobutane.

Another process with not such good yields consists in the reaction of acetophenone, or its homologues in which the methyl group is replaced by a higher alkyl radical, with nitroethane. A nitro-alcohol is hereby first formed, for example

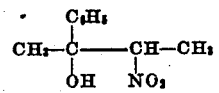

which is converted by dehydration into the corresponding nitroethylene

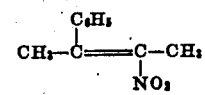

By reduction of this nitroethylene, 2-phenyl-3-aminobutane is again obtained.

A method of preparation which has proved particularly satisfactory likewise starts with a ketone, but a purely aliphatic ketone, for example, methyl ethyl ketone. This is converted by means of sodium bisulfite into the corresponding sodium bisulfite addition compound. By reaction of the bisulfite compound with potassium cyanide the corresponding cyanhydrin is obtained, which gives on hydrolysis an α-hydroxy-carboxylic acid. By dehydration of this α-hydroxy-carboxylic acid, an acrylic acid alkylated at both the carbon atoms connected by the double bond is obtained. With the aid of aluminium chloride, benzene can be added on to this compound so that a hydrocinnamic acid is obtained, for example when methyl ethyl ketone is used as the initial material there is obtained

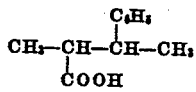

The carboxyl group may then be converted into an amino group by known methods, for example by decomposition according to Hofmann or Curtius. An especially satisfactory conversion of the carboxyl group into the amino group consists, according to F. Schmidt, in the reaction of the acid with hydrazoic acid in the presence of a suitable catalyst, for example concentrated sulfuric acid. In the case of the use of methyl ethyl ketone as initial material, there is obtained in this manner 2-phenyl-3-aminobutane. In the preparation of the N-alkylated amines, the above described primary bases are employed as initial materials and subjected to the customary alkylating methods. For example, the primary amines may be converted, by means of p-toluenesulfonylchloride, into the toluenesulfonamides which, as sodium compounds, may then be reacted with alkyl halogenides. By boiling with acids, under pressure if desired, the toluenesulfonyl radical can then be split off whereupon the secondary bases are obtained which in turn can be converted, by means of inorganic or organic acids, into the corresponding salts.

The invention is illustrated but not limited by the following examples.

EXAMPLE 1

*Preparation of 2-phenyl-3-aminobutane*

520 grams of sodium bisulfite solution (38–40° Bé.) are added with cooling and continuous agitation to 144 grams of methyl ethyl ketone. The reaction mixture sets after a few minutes to a solid mass and is allowed to cool completely when a solution of 130 grams of potassium cyanide in 200 c. c. of water is added; the bisulfite crystals thereby dissolve and the cyanhydrin separates as a colorless oil. Crude yield 203 grams.

The cyanhdrin is hydrolized, either with 4 times its volume of concentrated hydrochloric acid or with twice its weight of 96% sulfuric acid, to form methyl ethyl glycolic acid. 195 grams of pure methyl ethyl glycolic acid having a melting point of 71–72° C. are obtained (83% of the theoretical yield, calculated on the methyl ethyl ketone).

358 grams of methyl ethyl glycolic acid and 450 grams of acetic anhydride are heated together for 4 hours on an oil bath at 150° C. The acetic acid is subsequently distilled off. 250 grams of dimethyl acrylic acid are isolated from the distillation residue (84% of the theoretical yield).

30 grams of dimethylacrylic acid (dissolved in 220 grams of thiophene-free, dry benzene) and 100 grams of finely powdered anhydrous aluminium chloride are allowed to stand for 1 week at 40–45° C. Ice and concentrated hydrochloric acid are added to the reaction mixture. The benzene and aqueous layers are thereafter separated and, after evaporation of the benzene, 30 grams (56% of theoretical yield) of an acid boiling at 129–132° C. can be isolated from the residue by vacuum distillation at 5 mm. pressure. After one recrystallization from petroleum ether and benzene the melting point is 132° C.

Analysis gave a carbon content of 74.3% and a hydrogen content of 7.95%. For α,β-dimethyl hydrocinnamic acid the carbon content is calculated to be 74.2% and the hydrogen content 7.88%.

25 grams of this α,β-dimethyl hydrocinnamic acid are dissolved in 100 c. c. of chloroform. 50 c. c. of concentrated sulfuric acid are added as a layer below the solution and 16 gm. of sodium azide are added in portions to the reaction mixture slowly enough for the temperature of the reaction mixture to remain at 40–45° C. This temperature is maintained for a further 4½ hours until the evolution of gas has stopped. The reaction mixture is then poured on to ice, and by addition of alkali and extraction with ether 14.9 grams (71% of the theoretical yield) of 2-phenyl-3-aminobutane:

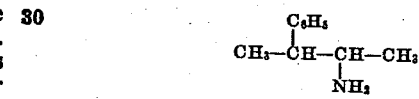

with a boiling point of 87–90° C. at 13–14 mm. pressure, or with a boiling point of 72° C. at 8 mm. pressure, may be isolated from the aqueous phase.

The α,β-dimethyl hydrocinnamic acid serving as an intermediate product in the preparation of 2-phenyl-3-aminobutane may be obtained by another method. A method of preparation of α,β-dimethyl hydrocinnamic acid which proves satisfactory is as follows:

630 grams of acetophenone (B. P. 202° C.) are boiled with 905 grams of pure α-bromopropionic acid ethyl ester in 800 grams of benzene with 350 grams of zinc wool for 4 hours. The reaction product is decomposed by means of dilute sulfuric acid and the benzene solution is distilled in vacuo. The α,β-dimethyl phenyl hydracrylic acid ethyl ester so obtained distils over at 140–142° C. under 12 mm. of mercury. The main fraction amounts to 780–890 grams, which corresponds to 70–80% of the theoretical yield.

To dehydrate this compound, 800 grams of the ester in 3 litres of benzene are boiled with 200 c. c. of phosphorus oxychloride for one hour. The reaction product is decomposed by means of ice and the benzene phase is distilled in vacuo. α,β-dimethyl cinnamic acid ethyl ester, which boils at 140–146° C. under 22 mm. of mercury, is obtained in a yield which is 65–70% of the theoretical amount.

To hydrolyze this ester, 500 grams of the ester are boiled with 1.5 kgs. of 36° Bé. caustic potash until a clear solution is obtained. After acidification, the solution is extracted with ether. The residue from the ether solution solidifies to a crystalline mass; α,β-dimethyl cinnamic acid having a melting point of 111–112° C. is obtained in 80% yield.

The α,β-dimethylcinnamic acid is hydrogenated by dissolving the acid in an equivalent amount of alkali and then hydrogenating it with colloidal palladium according to Paal and Skita. α,β-dimethyl hydrocinnamic acid, which can be recrystallized from 85% formic acid, and then melts at 133° C., is obtained in good yield by this method.

α-methyl hydrocinnamic acid substituted in the β-position by a higher alkyl radical in lieu of a methyl group can be obtained if the next higher homologues are used in place of acetophenone as starting material in the reactions described above. Propiophenone is correspondingly to be used as starting material for the preparation of α-methyl-β-ethyl hydrocinnamic acid.

The conversion of the hydrocinnamic acid into the corresponding amino compound is carried out in all cases according to the known methods of Hofmann, Curtius or F. Schmidt for the replacement of a carboxyl group by an amino group.

EXAMPLE 2

*Preparation of N-methyl-2-phenyl-3-aminobutane*

To 14.9 grams of 2-phenyl-3-aminobutane suspended in 100 cc. of 5 N-sodium hydroxide solution there were added while stirring 27 grams of toluenesulfonylchloride in portions. After a short time the reaction was finished whereupon the sulfonamide was extracted with ether. The ether residue was dissolved in 50 cc. of alcohol and 50 cc. of sodium hydroxide solution (20 per cent), and allowed to stand with 15 grams of methyl iodide for a few hours. The mixture was then slowly heated at 90° C. the alcohol being distilled off while the methyl compound precipitated. The latter was taken up in ether, the ether was evaporated, and the residue consisting of the toluenesulfonamide of the secondary base was heated with 50 per cent sulfuric acid at 140 to 150° C. for 5 hours. After rendering the solution alkaline, the methylated base was driven off with steam, extracted with ether, and distilled. After a small quantity of first runnings, pure N-methyl-2-phenyl-3-aminobutane distilled at 103 to 104° C. under 15 mm. Hg.

In the production of the corresponding N-ethyl- or N-propylamine, ethyl or propyl iodide are used in a similar manner.

EXAMPLE 3

*Preparation of 2-phenyl-3-aminobutane sulfate*

In order to produce 2-phenyl-3-aminobutane sulfate $(C_{10}H_{15}N)_2 \cdot H_2SO_4$, 29.2 grams of base boiling at 96° C. under 15 mm. were neutralized with 22.6 cc. of N 8.58-sulfuric acid, and the mixture was concentrated in a desiccator. 37 grams of the neutral sulfate, M. P. 280° C., were obtained. 7 parts by weight of water, at 20° C., dissolve 1 part by weight of sulfate.

EXAMPLE 4

*Preparation of acid 2-phenyl-3-aminobutane tartrate*

20 grams of base were dissolved in 50 cc. of methyl alcohol and admixed, while cooling, with a solution of 20 grams of d-tartaric acid in 50 cc. of water. Upon standing, the major part of the bitartrate crystallizes, while the rest can be obtained by concentrating the filtrate. Melting point 159 to 165° C.

As far as we are aware, the compounds disclosed herein constitute new compositions of matter which may find fields of utility apart from their use as the active constituent in stimulants. We desire that the invention be accorded a scope fully commensurate with its contributions to the art, as limited only by the fair requirements of the appended claims.

We claim:

1. A process for the production of a substance from the group consisting of 2-phenyl-3-aminobutane and 2-phenyl-3-methylamino butane which comprises reacting methyl ethyl ketone with sodium bisulfite, reacting the bisulfite compound so obtained with alkali cyanide to form nitrile of methyl ethyl glycolic acid, hydrolyzing said nitrile to form methyl ethyl glycolic acid, dehydrating said glycolic acid to form dimethyl acrylic acid, reacting said acrylic acid with benzene in the presence of aluminum chloride to form α,β-dimethyl hydrocinnamic acid, and substituting the carboxylic radical of said hydrocinnamic acid by a radical from the group consisting of amino and methyl amino radicals.

2. A process for the production of 2-phenyl-3-aminobutane which comprises reacting methyl ethyl ketone with sodium bisulfite, converting the bisulfite compound so obtained into nitrile of methyl ethyl glycolic acid by means of potassium cyanide, hydrolysing the said nitrile to methyl ethyl glycolic acid, dehydrating the methyl ethyl glycolic acid by boiling with acetic anhydride, reacting the dimethyl acrylic acid so obtained with benzene in the presence of aluminium chloride, and replacing the carboxyl group in the α,β-dimethyl hydrocinnamic acid so produced by an amino group by interaction with sodium azide in the presence of concentrated sulfuric acid as catalyst.

3. A process for the production of 2-phenyl-3-methylaminobutane which comprises reacting methyl ethyl ketone with sodium bisulfite converting the bisulfite compound so obtained into nitrile of methyl ethyl glycolic acid by means of potassium cyanide, hydrolysing the said nitrile to methyl ethyl glycolic acid, dehydrating the methyl ethyl glycolic acid by boiling with acetic anhydride, reacting the dimethyl acrylic acid so obtained with benzene in the presence of aluminium chloride, and replacing the carboxyl group in the α,β-dimethyl hydrocinnamic acid so produced by an amino group by interaction with sodium azide in the presence of concentrated sulfuric acid as catalyst and subsequently methylating the amino group.

FELIX HAFFNER.
FRITZ SOMMER.